(12) United States Patent
White et al.

(10) Patent No.: US 6,547,286 B1
(45) Date of Patent: Apr. 15, 2003

(54) JOINT FOR CONNECTING CERAMIC ELEMENT TO A TUBESHEET

(75) Inventors: James Eric White, Amherst, NY (US); Michael John Stanko, Grand Island, NY (US); William Timothy Gleisle, Orchard Park, NY (US); Victor Emmanuel Bergsten, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/026,647

(22) Filed: Dec. 27, 2001

(51) Int. Cl.[7] ................................................ F16L 19/00
(52) U.S. Cl. ...................... 285/354; 403/187; 55/523; 55/524; 210/323.2
(58) Field of Search ............................ 285/354, 354.5, 285/294.2; 403/187, 194, 195, 197, 201; 55/523, 524; 210/323.2

(56) References Cited

U.S. PATENT DOCUMENTS

| | | | | |
|---|---|---|---|---|
| 2,251,715 A | * | 8/1941 | Parker | 285/114 |
| 2,458,817 A | * | 1/1949 | Wolfram | 285/328 |
| 3,346,274 A | * | 10/1967 | Baron | 285/52 |
| RE26,870 E | * | 4/1970 | Sullivan | 285/354 |
| 3,747,964 A | * | 7/1973 | Nilsen, Jr. | 285/337 |
| 3,855,400 A | * | 12/1974 | Paolieri et al. | 423/488 |
| 4,296,950 A | * | 10/1981 | Chamberlin | 285/45 |
| 4,917,302 A | | 4/1990 | Steinetz et al. | |
| 5,082,293 A | | 1/1992 | Steinetz et al. | |
| 5,301,595 A | | 4/1994 | Kessie | |
| 5,401,406 A | | 3/1995 | Johnson et al. | |
| 5,599,383 A | | 2/1997 | Dyer et al. | |
| 5,611,931 A | | 3/1997 | Liu et al. | |
| 5,775,269 A | * | 7/1998 | Lawrence | 122/511 |
| 6,139,810 A | * | 10/2000 | Gottzmann et al. | 422/197 |
| 6,454,274 B2 | * | 9/2002 | White et al. | 277/630 |

FOREIGN PATENT DOCUMENTS

EP   1067320   1/2001

\* cited by examiner

*Primary Examiner*—Lynne H. Browne
*Assistant Examiner*—James M. Hewitt
(74) *Attorney, Agent, or Firm*—David M. Rosenblum

(57) ABSTRACT

A joint to connect a tubular ceramic element to a tubesheet. The joint has an internal seal housing to retain the tubular ceramic element and an external seal housing connected to the tubesheet to retain the internal seal housing. A ceramic-to-metal seal is located within the internal seal housing and a metal-to-metal seal is located between the internal seal housing and an external seal housing. The external seal housing is connected to the tubesheet. The internal seal housing is assembled in sections to allow assembly of the ceramic-to-metal seal to be assembled and tested prior to joining the tubular ceramic element to the tubesheet. After perfection of such seal, the internal seal housing and tubular ceramic element is inserted into the external seal housing and sealed within the external seal housing by the metal-to-metal seal.

13 Claims, 3 Drawing Sheets

JOINT FOR CONNECTING CERAMIC ELEMENT TO A TUBESHEET

FIELD OF THE INVENTION

The present invention relates to a joint for connecting an open end of a tubular ceramic element to a tubesheet. More particularly, the present invention relates to such a joint in which an internal seal housing is connected to the tubular ceramic element and an external seal housing, connected to the tubesheet, retains the internal seal housing and therefore, the tubular ceramic element.

BACKGROUND OF THE INVENTION

Tubular ceramic elements such as candle filters and oxygen transport membranes are supported by metal tubesheets within devices such as filter assemblies and reactors, respectively, that are designed to operate at high temperature. The joining of such ceramic elements to tubesheets in a manner that provides a seal at the juncture is very problematical due to the dissimilarity in the thermal expansion characteristics of ceramic and metallic materials and the high temperature environment in which such elements operate.

For instance, in a reactor that contains oxygen transport membrane tubes, the oxygen transport membrane tubes are supported by a tubesheet. An oxygen containing gas is exposed to a cathode side of the membrane where oxygen gains two electrons to become ionized. The ceramic material making up the membrane transports the oxygen ions to an opposite anode side where electrons are lost to the membrane and the oxygen ions reconstitute to form elemental oxygen which can be collected or reacted to produce reaction components. Depending upon the reactor design the oxygen containing gas is either introduced into the tubes or to the outer surfaces of the tubes with the elemental oxygen or reaction products being extracted from the opposite surfaces of the tubes. In order to effect such a process, the oxygen containing gas and the elemental oxygen or reaction components to be collected are segregated by the tubesheet and therefore, the juncture of the oxygen transport membrane tubes and the tubesheet must incorporate a seal.

An example of such a seal can be found in EP 106 732 0 A2 in which a gas type seal is formed by utilizing one or more compliant metallic, torus-like ring sealing elements. In the seal disclosed in this patent, a ceramic membrane tube is held and sealed within an external seal housing by way of the ring sealing elements that is force fit into a second passageway of the external seal housing U.S. Pat. No. 5,401,406 discloses a seal for a filter element to connect the filter element to a tubesheet. The filter element has an enlarged end that fits within a second passageway of the tubesheet. A disc-like element bears against compressible, sealing material located at the open end of the filter element and between the filter element and the tubesheet. The disc-like element is attached to the tubesheet, by means such as by welding, to function as a hold down element to hold the filter element in place, sealed against the tubesheet and sealed against the hold down element.

In all of these foregoing references, the seal between the tubular ceramic element and the tubesheet, the ceramic-to-metal seal, is produced during assembly of the ceramic elements and the tubesheet. As mentioned above, it is difficult to make reliable cermic-to-metal seals in the first instance. This sealing problem becomes particularly troublesome when many tubular ceramic elements are to be attached to a tubesheet. For instance, during assembly, when long ceramic elements are maneuvered into proper position relative to the tubesheet, great care must be taken to not damage the ceramic elements while at the same time effecting a seal at each juncture of the ceramic elements and the tubesheet. Furthermore, such assembly only allows for the testing of the ceramic-to-metal seal after assembly. If there are defective seals, individual elements must be removed and reassembled.

As will be discussed, the present invention provides a joint between a tubular ceramic element and a tubesheet that incorporates a ceramic-to-metal seal that does not have the foregoing assembly problems because such seal is formed prior to attachment of the tubular ceramic element to the tubesheet itself.

SUMMARY OF THE INVENTION

The present invention provides a joint for connecting a tubular ceramic element to a tubesheet. The joint has a metallic, internal seal housing to retain the tubular ceramic element and a metallic, external seal housing connected to the tubesheet to retain the internal seal housing. The ceramic-to-metal seal is located within the internal seal housing to seal the tubular ceramic element within the internal seal housing. A less troublesome metal-to-metal seal is located within the external seal housing to seal the internal seal housing within the external seal housing.

The internal seal housing has a first passageway communicating between opposite open ends thereof. The first passageway is configured to receive an open end portion of the tubular ceramic element such that the tubular ceramic element projects from one of the opposite open ends and an interior region of the tubular ceramic element is in flow communication with the other of the opposite open ends. The internal seal housing has an internal sealing surface defined in the first passageway and is assembled in sections to allow the tubular ceramic element to be inserted into the internal seal housing with the open end portion of said tubular ceramic element located adjacent to the sealing surface.

The ceramic-to-metal seal is situated between the internal sealing surface and the open end portion of the tubular ceramic element to seal the first passageway and to hold the tubular ceramic element in place.

The external seal housing is connected to an opening in the tubesheet and is configured to hold the internal seal housing within a second passageway thereof. The second passageway is in flow communication with opposite sides of said tubesheet. At least one metal-to-metal seal is located within the second passageway and between the internal seal housing and an interior surface of the second passageway.

Since the internal seal housing is assembled in sections and contains the ceramic-to-metal seal, such seal can be perfected for each of the tubular ceramic element prior to their being joined to the tubesheet. After assembly and suitable testing of this seal, the internal seal housing is then inserted into the external seal housing when the metal-to-metal seal is effected between such components. Since, the metal-to-metal seal presents a less difficult sealing problem that the ceramic-to-metal seal, the joinery of the present invention allows for a more certain assembly of the tubular ceramic elements and the tubesheet with fewer sealing defects than the prior art.

Advantageously, the sections of the internal seal housing can be formed by first and second sections having first and second passageway portions, respectively, to form the first passageway. In such case, the internal sealing surface is defined in the first passageway portion. The open end portion of the tubular ceramic element can be provided with an outwardly flared, conical-like configuration and the internal sealing surface can also be of conical configuration, complimenting the outwardly flared, conical-like configuration of the open end portion. A sealing material is located between said open end portion of the tubular ceramic element and the internal sealing surface. Assembly of the first and second sections drives the open end portion against the sealing material and the internal sealing surface to effect the ceramic-to-metal seal and to hold the tubular ceramic element in place, retained within the internal seal housing.

Preferably, the ceramic-to-metal seal can further comprise an internal washer-like gasket located between the open end portion of the tubular ceramic element and the second section of the internal seal housing at a terminus of the second passageway portion thereof. Advantageously, the first and second sections of the internal seal housing are connected to one another by a threaded engagement.

The second passageway of the external seal housing can terminate, at one end thereof, in an annular shoulder defining an aperture through which the tubular ceramic element projects. The annular shoulder also defines the interior surface for sealing. An external washer-like gasket is located between an undersurface of the first section of the internal seal housing and the interior surface defined by the annular shoulder. A retaining element threadably engages a threaded end of the external seal housing, opposite to the aperture, to bear against the internal seal housing and drive the internal seal housing against the external washer-like gasket to seal the internal seal housing within the external seal housing, thereby to effect the at least one metal-to-metal seal.

The external washer-like gasket can be a first of two external washer-like gaskets. The second section of the internal seal housing can be provided with an annular flange positioned to overlie the threaded end of the external seal housing. The retaining element bears against the annular flange and a second of the two external washer-like gaskets, located between the annular flange and the opposite end of the internal seal housing, to provide a seal between the annular flange and the opposite end of the internal seal housing. An annular space is defined between the internal seal housing and the external seal housing. The external seal housing can have an inlet to introduce a buffer gas in the annular space and the first section of the internal seal housing can be ported to allow the buffer gas to pressurize the first passageway portion of said first passageway. In such manner, the buffer gas prevents leakage of process fluid of the particular process of concern through the ceramic-to-metal seal and therefore, the tubesheet.

When a buffer gas is used, in order to ensure proper sealing of the external seal housing, the internal seal housing can further be provided with a third, spacer section configured to threadably engage the first section of the internal seal housing and to contact the annular surface of the external seal housing. This threaded engagement allows the overall length of the internal seal housing to be adjusted to aid in ensuring proper sealing at the external seals provided by first and second external washer-like gaskets.

In any embodiment of the present invention, the sealing material for the ceramic-to-metal seal can be a rope seal.

Specific embodiments of the present invention are provided to ensure perfection of the seal located at the internal gasket-like washer. In one embodiment, the open end portion of the tubular ceramic element can be provided with a spherical end section. The second passageway portion of the first passageway in such embodiment has an annular recessed surface at the terminus of the second passageway portion of the first passageway. The annular recessed surface has a stepped, chamfered configuration to center the internal gasket-like washer with respect to the second passageway portion of the first passageway and such that the internal gasket-like washer bears against the spherical end section of the tubular ceramic element to align said tubular ceramic element with the second passageway portion of the first passageway.

In another embodiment of the present invention to ensure proper sealing at the internal gasket-like washer, the annular surface at the terminus of the second passageway portion of first passageway is a conical recessed surface. A metallic washer is interposed between the internal washer-like gasket and the annular surface. The metallic washer has an outer, curved transverse cross-section to center the metallic washer with respect to the second passageway portion of the first passageway.

Any of the internal or first and second external washer-like gaskets can be formed of graphite, asbestos, vermiculite, or boron nitrite contained in a metal jacket.

BRIEF DESCRIPTION OF THE DRAWINGS

While the specification concludes with claims distinctly pointing out the subject matter that Applicants regard as their invention, it is believed that the invention would be better understood when taken in connection with the accompanying drawings in which:

DETAILED DESCRIPTION

Figure 1:
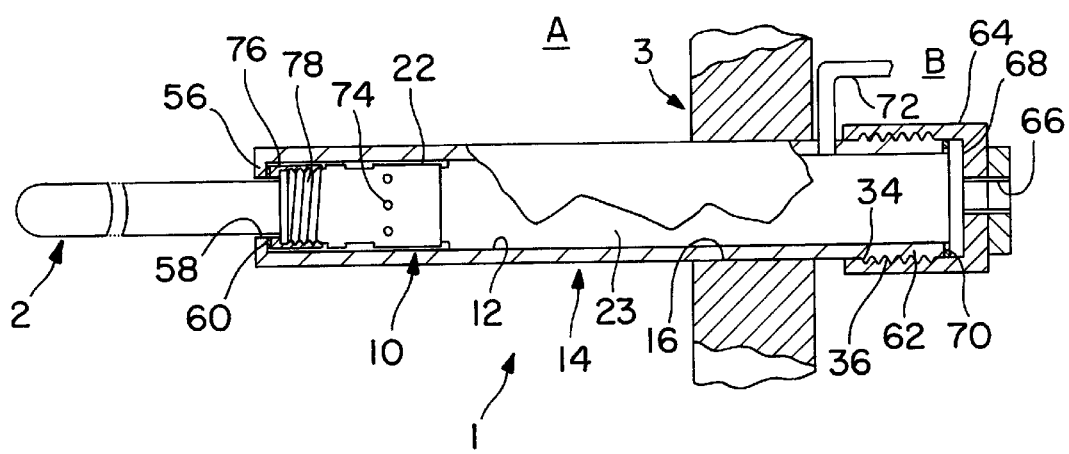
FIG. 1 is an elevational view of a joint in accordance with the present invention to connect a tubular ceramic element to a tubesheet with portions broken away.

With reference to FIG. 1, a joint 1 in accordance with the present invention is illustrated. Joint 1 serves to connect a tubular ceramic element 2 to a tubesheet 3 to allow process fluids to flow between a side "A" of tubesheet 3 and the interior of tubular ceramic membrane tube while isolating side "A" of tube sheet 3 from an opposite side "B" of tubesheet 3 from side "A".

Joint 1 is formed by an internal seal housing 10, preferably having an outer cylindrical configuration, that is connected to tubular ceramic element 2 with a first passageway designated by reference number 21 (to be discussed in more detail hereinafter). Internal seal housing 10 is retained within a second passageway 12 of an external seal housing 14, also preferably of tubular configuration. External seal housing 14 is in turn extended through an opening 16 of tube sheet 3 and is held in place by such means as welding. The weld also serves to effect a seal between external seal housing 16 and tubesheet 3. In practice, tubesheet 3 would be provided with a plurality of openings 16 and external seal housing 14.

Internal seal housing 10 and external seal housing 14 are metallic and can be formed of suitable high temperature alloys such as HAYNES 230 nickel-chromium alloy, HAYNES 214 nickel-chromium-aluminum alloy, INCOLOY 800HT nickel-iron-chromium alloy, or INCONEL 601 nickel-chromium-aluminum alloy.

Figure 2:
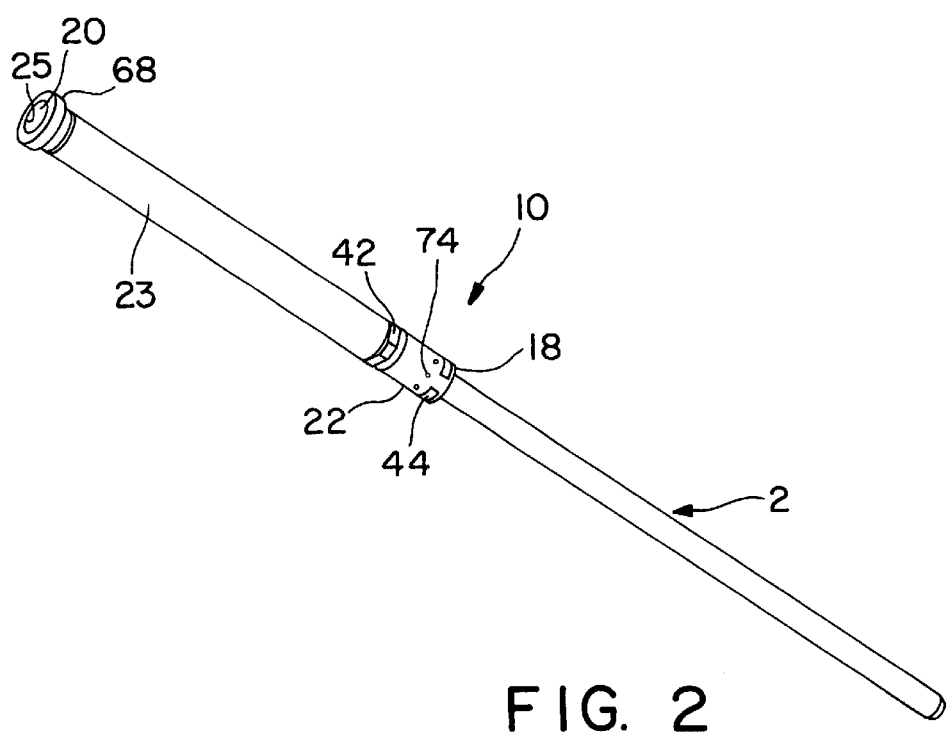
FIG. 2 is a perspective view of an assembly of an internal seal housing of the joint of FIG. 1 and a tubular ceramic element.
Figure 3:
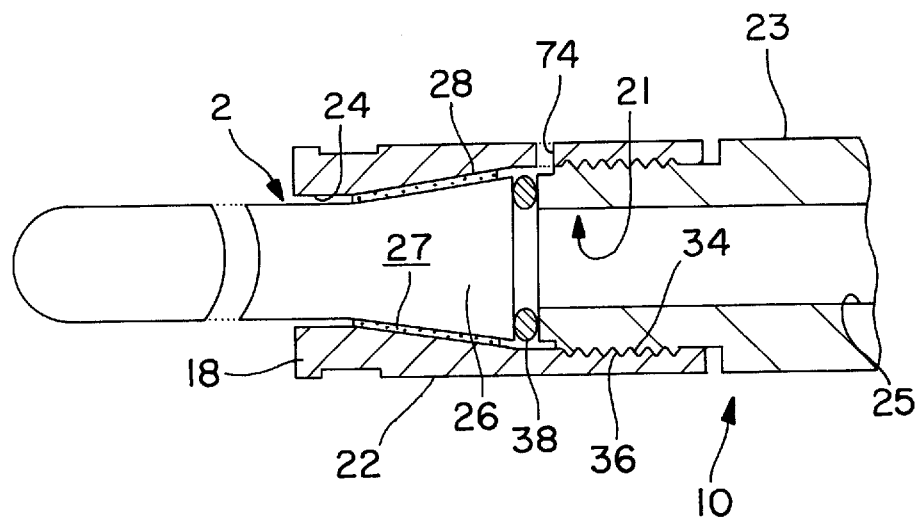
FIG. 3 is a fragmentary cross-sectional view of the assembly illustrated in FIG. 2.

With additional reference to FIGS. 2 and 3 internal seal housing 10 is provided with opposed open ends 18 and 20 and a first passageway 21 communicating between opposed open ends 18 and 20. Internal seal housing 10 is preferably formed of first and second sections 22 and 23 that contain first and second passageway portions 24 and 25, respectively, of first passageway 21. When first and second sections 22 and 23 of internal seal housing 10 are assembled an open end portion 26 of tubular ceramic element 2 is received within first passageway 21 of internal seal housing 10 with tubular ceramic element 2 projecting from open end 18 of internal seal housing 10.

Preferably, open end portion 26 of tubular ceramic element 2 has an outwardly flared, conical-like configuration. First section 22 of internal seal housing 10 has a conical sealing surface 27 defined within first passageway portion 24 of first passageway 21 that compliments the configuration of open end portion 26 of tubular ceramic element 2. A sealing material 28 is located between open end portion 26 of tubular ceramic element 2 and sealing surface 27 to complete an internal ceramic-to-metal seal within internal seal housing 10.

Figure 4:
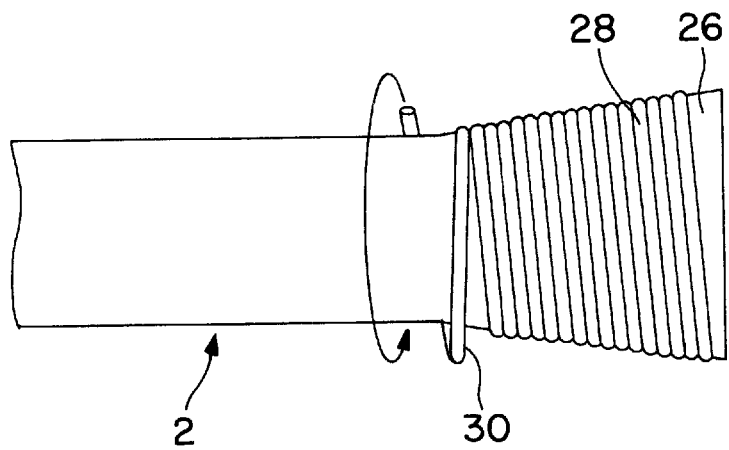
FIG. 4 is a fragmentary perspective view of the winding of a rope seal used within FIG. 3.
Figure 5:
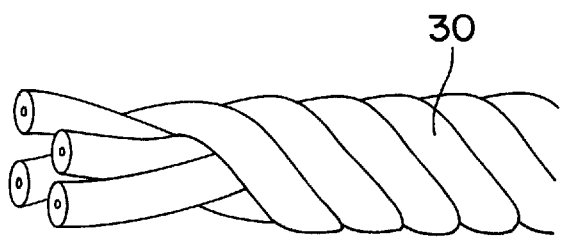
FIG. 5 is an enlarged, perspective, fragmentary view of rope seal material used in FIG. 4.

With additional reference to FIGS. 4 and 5 sealing material 28 can be a rope seal formed of a high temperature rope sealing material 30, preferably NEXTEL™ ceramic fiber rope, that is wound around open end portion 26 of tubular ceramic element 2. The assemblage is then extended within first section 22 of internal seal housing 10 so that sealing material 28 is between open end portion 26 of tubular ceramic element 2 and sealing surface 27. Upon assembly of first and second sections 22 and 23 of internal seal housing 10, open end portion 26 is driven against sealing material 28 and sealing surface 27 to form an internal ceramic-to-metal seal within internal seal housing 10.

As may be appreciated, other types of sealing material 28 can be used in place of high temperature rope sealing material 30. For instance, sealing material 28 could be a conical gasket fabricated from either a graphite sheet, a ceramic fiber mat or felt, or a combination of graphite and ceramic fiber. The ceramic-to-metal seal could be effected by known brazing techniques; and in such case, sealing material 28 would be brazing material.

Various other types of known compression seals are possible in place of the specific compression seal illustrated in the Figures. For instance, the prior art is replete with compression seals that can be used with tubular ceramic elements that do not incorporate the outwardly flared open end portion 26 and the conical sealing surface. In such seals, a sealing material, for instance, a rope sealing material wound about the end of a cylindrical element, is compressed to effect the seal. The compression squashes the sealing material, thereby to cause the sealing material to deform and hold the element is place.

Preferably, first section 22 of internal seal housing 10 is provided with internal threads 36 to engage enternal threads 34 formed within second section 23 of internal seal housing 10. Thus, assembly of the seal housing 10 and tubular ceramic element 2 is simply a matter of screwing first and second sections 22 and 23 together. As may be appreciated, other types of known releasable engagement are possible. Though less preferred, however, permanent attachment methods can be used such as welding.

An internal washer-like gasket 38 is provided between second section 23 of internal seal housing 10 at the annular surface formed at the terminus of second passageway portion 25 of first passageway 21 and open end section 26 of tubular ceramic element 2. Internal washer-like gasket 38 provides a secondary internal seal within internal seal housing 10 to prevent the escape of any fluids at the juncture of open end portion 26 of tubular ceramic element 2 and second passageway portion 25 of first passageway 21.

In order to aid the assembly of first and second sections 22 and 23 and to ensure a tight internal seal produced at internal sealing surface 27 and at washer-like gasket 38, a set of hexagonal flats 42 can be provided on second section 23 and a set of indentations 44 can be provided on first section 22 for gripping first and second sections 22 and 23 by suitable tools such as wrenches when assembling internal seal housing 10.

Figure 6:
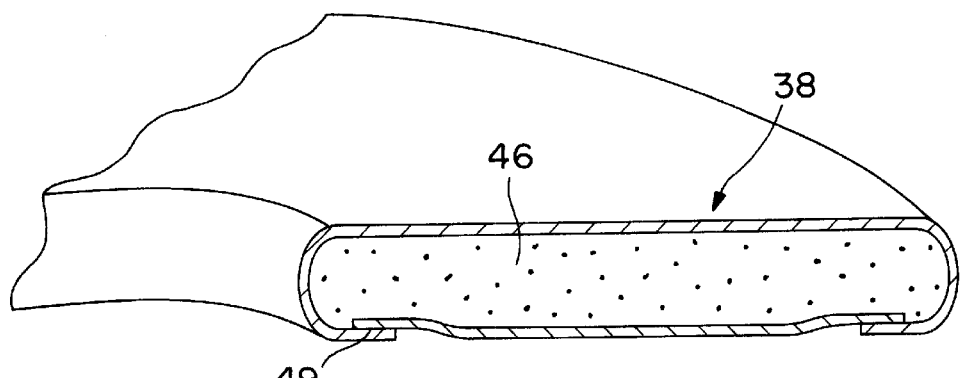
FIG. 6 is a fragmentary, cross-sectional view of a washer-like gasket.

With reference to FIG. 6 washer-like gasket 38 can be formed of a graphite 46 core jacketed within a metal jacket 48 formed from a metal foil of INCONEL 601 or INCONEL 625 nickel-chromium-aluminum alloys.

It is possible that the metal alloy forming the metal jacket 48 will chemically interact with certain ceramics that are commonly used in oxygen transport membrane elements. In order to avoid this, a further refractory ceramic washer formed of magnesia, ceria or zirconia can be interposed between the ceramic membrane and washer-like gasket 38. Metallic washers fabricated from either HAYNES 230 nickel-chromium alloy, silver or gold can be used for such purposes. A still further alternative to alleviate material incompatibility problems is to apply a spray or painted coating to metal jacket 48. Such spray or painted coating can be formed of a refractory ceramic such as zirconia, ceria, magnesia, yttria or an anti-seize compound such as Ni—C. Yet further possibilities include: forming metal jacket 48 from HAYNES 230 alloy; plating metal jacket 48 with a thermal spray of a refractory ceramic; and electroplating gold, silver, or nickel onto metal jacket 48.

In environments where washer-like gasket 38 is exposed to high oxygen concentrations, there exists the possibility of graphite degradation. In order to avoid this, laps 49 can be sealed with a plated noble metal, for instance gold or silver, an alloy braze or laser welding. Alternative filler could be used, for instance, asbestos, vermiculite, or boron nitrite. Jacket plating, such as discussed above, or providing extended lap area of laps 49 could also be incorporated to help prevent graphite degradation under such circumstances.

As an alternative to the jacketed construction of the washer-like gasket 38, solid gaskets are possible that are fabricated from metal alloys, noble metals, and ceramics.

Figure 7:
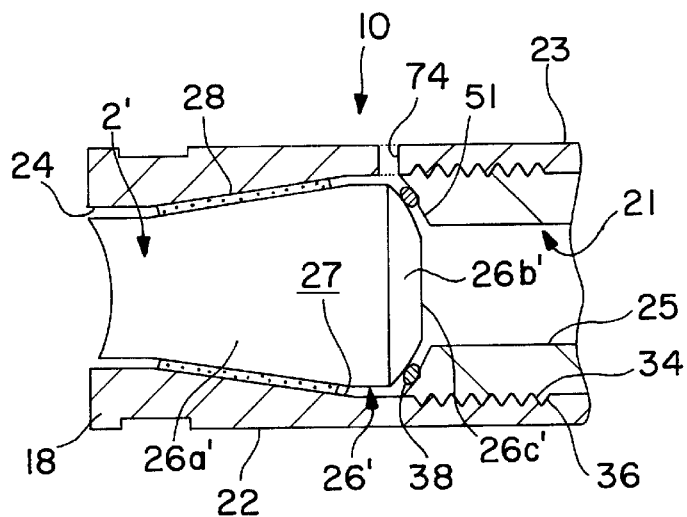
FIG. 7 is a fragmentary cross-sectional view of an alternative embodiment of an internal seal housing in accordance with the present invention.

With reference to FIG. 7, a tubular ceramic element 2' can be used to insure proper alignment of the centerlines of the tubular ceramic element and internal seal housing 10 and therefore, a successful seal at the juncture of the tubular ceramic element and second passageway portion 25 of first passageway 21. Tubular ceramic element 2' is provided with an open end portion 26' having a conical section 26'a and a spherical end section 26'*b*. Conical section 26'*a* has much the same configuration as the outwardly flared, conical-like configuration of open end portion 26 of tubular ceramic element 2 of the previous embodiment discussed above. Spherical end section 26'*b* is configured to define an opening 26'*c* within open end portion 26'.

In such embodiment, the annular surface formed at the terminus of second passageway portion 25 of first passageway 21 can be an annular recessed surface 51 having a stepped, chamfered configuration. The stepped, chamfered configuration of annular recessed surface 51 helps to center gasket-like washer 38 so that it bears against spherical end section 26'*b* to urge tubular ceramic element 2' into a proper alignment with the centerlines of tubular ceramic element 2' and second passageway portion 25 coincident.

Figure 8:
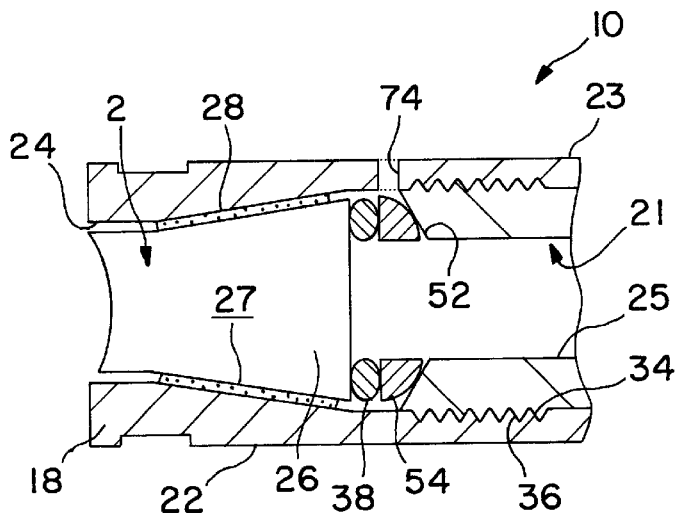
FIG. 8 is a fragmentary cross-sectional view of a further alternative embodiment of an internal seal housing of the present invention.

With reference to FIG. 8, an alternative manner of helping to ensure a successful seal at the juncture of the tubular ceramic element and second passageway portion 25 of first passageway 21 is illustrated. In this embodiment, the annular surface at the terminus of second passageway portion 25 of first passageway 21 is a conical recessed surface 52 to accept a metallic washer 54. Metallic washer 54 has an outer, curved transverse cross-section to center metallic washer 54 with respect to second passageway portion 25 of first passageway 21. During assembly of internal seal housing 10, after tubular ceramic element 2 is inserted into first section 22 of internal seal housing 10, washer-like gasket 38 and metallic washer 53 is positioned on open end portion 26 thereof with their surfaces coaxially aligned. Thereafter, second section 23 is threaded onto first section 22 to assemble seal housing 10 with all components of the seal properly aligned to ensure proper sealing.

It is to be noted that the use of internal washer-like gasket 38, though preferred, is optional. While such use is particularly preferred where tubular ceramic element 2 is an ion transport membrane, in various applications of the present invention, internal washer-like gasket could be dispensed with.

With reference again to FIG. 1, second passageway 12 of external seal housing 14 can terminate, at one end thereof, in an annular shoulder 56 defining an aperture 58 through which tubular ceramic element 2 projects. A first external washer-like gasket 60 is located between an undersurface of first section 22 of internal seal housing 10. First external washer-like gasket 60 can have the same design as internal washer-like gasket 38. An opposite end 62 of external seal housing 14 is threaded and a nut-like retaining element 64 threadably engages opposite end 62 to drive internal seal housing 10 against first external washer-like gasket 60 and shoulder 56 to effect a metal-to-metal seal. Nut-like retaining element 64 has an opening 66 to allow for flow communication between side "B" of tubesheet 3 and first passageway 21 of internal seal housing 10. The foregoing metal-to-metal seal, seals internal seal housing 10 within external seal housing 14 and holds the same in place.

A yet further seal can be provided by a buffer gas in the following manner. With reference again to FIGS. 1 and 2, second section 23 of internal seal housing 10 can be provided with an annular flange 68 to bear against a second external washer-like gasket 70 and opposite end 62 of external seal housing 14 when nut-like retaining element 64 is tightened. Second external washer-like gasket 70 can have the same design as internal washer-like gasket 38. The further metal-to-metal seal produced by second washer-like gasket 70 prevents process fluid from entering external seal housing 14. External seal housing 14 is in turn provided with an inlet 72 to introduce a buffer gas of pressure greater than that at opposite sides "A" and "B" of tubesheet 3 into an annular space defined between the internal seal housing 10 and external seal housing 14. In this regard, the annular space is simply provided by the clearance necessary to allow internal seal housing 10 to slide within external seal housing 14. First section 22 is ported, by provision of ports 74 to allow buffer process fluid to pressurize an interior region of internal seal housing 10 containing internal washer-like gasket 38, thereby to in turn prevent leakage of process fluid passing within first passageway 21 at the seal provided by internal washer-like gasket 38 and also, to prevent any leakage of process fluid into seal housing 10 through the seal provided at sealing material 27.

While the use of the metal-to-metal seals provided at external first and second washer-like gaskets 60 and 70 are preferred, other sealing techniques are possible, though less preferred, such as welding.

In order to appropriately position internal seal housing 10 within external seal housing 14 to effectuate both metal-to-metal seals provided at first and second external washer-like gaskets 60 and 70, internal seal housing 10 can be provided with a third spacer section 76. Third spacer section 76 is threadably attached to first section 22 of internal seal housing 10 by provision of threads 78 to adjust the overall length of seal housing 10.

While the present invention has been described in reference to a preferred embodiment, as will occur to those skilled in the art, numerous changes, additions and omissions may be made without departing from the spirit and scope of the present invention.

We claim:

1. A joint connecting a tubular ceramic element to a tubesheet, said joint comprising:

a metallic internal seal housing having a first passageway communicating between opposite open ends thereof and configured to receive an open end portion of said tubular ceramic element such that said tubular ceramic element projects from one of the opposite open ends and an interior region of said tubular ceramic element is in flow communication with the other of the opposite open ends;

said internal seal housing having an internal sealing surface defined in said first passageway and assembled in sections to allow said tubular ceramic element to be inserted into the internal seal housing with said open end portion of said tubular ceramic element adjacent said sealing surface;

a ceramic to metal seal situated between said internal sealing surface and said open end portion of said tubular ceramic element to seal said first passageway and to hold said tubular ceramic element in place;

a metallic external seal housing connected to an opening in said tubesheet and configured to hold said internal seal housing within a second passageway thereof, the second passageway being in flow communication with opposite sides of said tubesheet; and at least one metal-to-metal seal located within said second passageway and between said internal seal housing and an interior surface of said second passageway.

2. The joint of claim 1, wherein said sections of said internal seal housing are formed by first and second sections having first and second passageway portions, respectively, to form the first passageway and the internal sealing surface is defined in said first passageway portion.

3. The joint of claim 2, wherein:

said open end portion of said tubular ceramic element has an outwardly flared, conical-like configuration;

said internal sealing surface is also of conical configuration, complimenting the outwardly flared, conical-like configuration of said open end portion;

a sealing material is located between said open end portion of said tubular ceramic element and the internal sealing surface; and assembly of said first and second sections drives said open end portion against said sealing material and said internal sealing surface to effect said ceramic-to-metal seal and to hold said tubular ceramic element in place, retained within said internal seal housing.

4. The joint of claim 3, wherein said ceramic-to-metal seal further comprises an internal washer-like gasket located between said open end portion of said tubular ceramic element and said second section of said internal seal housing at a terminus of said second passageway portion thereof.

5. The joint of claim 2 or claim 3 or claim 4, wherein said first and second sections of said internal seal housing are connected to one another by a threaded engagement.

6. The joint of claim 4, wherein:

said second passageway of said external seal housing terminates, at one end thereof, in an annular shoulder defining an aperture through which said tubular ceramic element projects and defining said interior surface;

an external washer-like gasket is located between an undersurface of said internal seal housing and said interior surface defined by said annular shoulder; and a retaining element threadably engages a threaded end of said external seal housing, opposite to said aperture, to bear against said internal seal housing and drive said internal seal housing against said external washer-like gasket to seal said internal seal housing within said external seal housing and thereby to effect said at least one metal-to-metal seal.

7. The joint of claim 6, wherein:

said external washer-like gasket is a first external washer-like gasket;

said second section of said internal seal housing has an annular flange positioned to overlie said threaded end of said external seal housing;

said retaining element bears against said annular flange;

a second external washer-like gasket, located between said annular flange and said opposite threaded end of said external seal housing, provides a further metal-to-metal seal between said annular flange and said opposite end of said external seal housing;

an annular space is defined between said internal seal housing and said external seal housing;

said external seal housing has an inlet to introduce a buffer gas in said annular space; and said first section of said internal seal housing is ported to allow said buffer gas to pressurize said first passageway portion of said first passageway.

8. The joint of claim 7, wherein said internal seal housing further has a third, spacer section configured to threadably engage said first section of said internal seal housing to contact an annular surface of said external seal housing, thereby to adjust overall length of said internal seal housing.

9. The joint of claim 3 or claim 4, wherein said sealing material is a rope seal.

10. The joint of claim 4, wherein:

said open end portion of said tubular ceramic element has a spherical end section;

said second passageway portion of said first passageway has an annular recessed surface at the terminus of second passageway portion of the first passageway; and the annular recessed surface has a stepped, chamfered configuration to center said internal washer-like gasket with respect to the second passageway portion of the first passageway and such that said internal gasket-like washer bears against the spherical end section of the tubular ceramic element to align said tubular ceramic element with said second passageway portion of the first passageway.

11. The joint of claim 4, wherein:

an annular surface at the terminus of second passageway portion of first passageway is a conical recessed surface; and a metallic washer is interposed between said internal washer-like gasket and said annular surface;

the metallic washer having an outer, curved transverse cross-section to center the metallic washer with respect to the second passageway portion of the first passageway.

12. The joint of claim 4, wherein said internal washer-like gasket is formed of graphite, asbestos, vermiculite, or boron nitrite contained in a metal jacket.

13. The joint of claim 7, wherein said first and second external washer-like gaskets are formed of graphite, asbestos, vermiculite, or boron nitrite contained in a metal jacket.

\* \* \* \* \*